US011953171B2

United States Patent
(12) United States Patent
Inoue et al.

(10) Patent No.: US 11,953,171 B2
(45) Date of Patent: Apr. 9, 2024

(54) VEHICLE LIGHTING DEVICE

(71) Applicant: Ichikoh Industries, Ltd., Isehara (JP)

(72) Inventors: Katsuhiko Inoue, Isehara (JP); Eiji Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/003,039

(22) PCT Filed: Jun. 24, 2021

(86) PCT No.: PCT/JP2021/023960
§ 371 (c)(1),
(2) Date: Dec. 22, 2022

(87) PCT Pub. No.: WO2021/261559
PCT Pub. Date: Dec. 30, 2021

(65) Prior Publication Data

US 2023/0250932 A1 Aug. 10, 2023

(30) Foreign Application Priority Data

Jun. 24, 2020 (JP) ................................ 2020-108720

(51) Int. Cl.
*F21S 41/27* (2018.01)
*F21S 41/147* (2018.01)
(Continued)

(52) U.S. Cl.
CPC ............ *F21S 41/27* (2018.01); *F21S 41/147* (2018.01); *F21S 41/153* (2018.01);
(Continued)

(58) Field of Classification Search
CPC ........ F21S 41/153; F21S 41/265; F21S 41/27; F21S 41/32; F21W 2102/135
See application file for complete search history.

(56) References Cited

U.S. PATENT DOCUMENTS 6,568,833 B2 * 5/2003 Worgan .................. F21S 43/14 362/555
2017/0343173 A1 * 11/2017 Takada ................. F21S 41/255
2020/0263848 A1 8/2020 Gousset-Rousseau

FOREIGN PATENT DOCUMENTS

CN 105 465 715 A 4/2016
CN 210 740 260 U 6/2020

(Continued)

OTHER PUBLICATIONS

International Search Report dated Aug. 17, 2021 in PCT/JP2021/023960 filed on Jun. 24, 2021.

(Continued)

*Primary Examiner* — Thomas M Sember
(74) *Attorney, Agent, or Firm* — Oblon, McClelland, Maier & Neustadt, L.L.P.

(57) ABSTRACT

A vehicle lighting device includes a high-light source group, a low-light source group, a high-beam lens to transmit light from the high-beam light source and emit the light to outside, a low-beam lens to transmit light from the low-beam light source and emit the light to outside, a circuit board having the high-beam light source and the low-beam light source mounted thereon together, and a reflector that guides light emitted from the low-beam light source to the low-beam lens, where the circuit board is inclined in a front-rear direction and an up-down direction.

6 Claims, 2 Drawing Sheets

(51) Int. Cl.

| | |
|---|---|
| ***F21S 41/153*** | (2018.01) |
| ***F21S 41/265*** | (2018.01) |
| ***F21S 41/32*** | (2018.01) |
| ***F21W 102/135*** | (2018.01) |

(52) U.S. Cl.
CPC ............. *F21S 41/265* (2018.01); *F21S 41/32* (2018.01); *F21W 2102/135* (2018.01)

(56) References Cited

FOREIGN PATENT DOCUMENTS

| | | | |
|---|---|---|---|
| CN | 210 740 277 | U | 6/2020 |
| EP | 3 232 118 | A1 | 10/2017 |
| JP | 2018 037298 | A | 3/2018 |

OTHER PUBLICATIONS

Extended European search report dated Nov. 6, 2023 in European Patent Application No. 21830066.3, citing documents 15-18 therein, 118 pages.

* cited by examiner

VEHICLE LIGHTING DEVICE

TECHNICAL FIELD

The present invention relates to a vehicle lighting device.

BACKGROUND ART

A vehicle lighting device in which a high-beam light source and a low-beam light source are arranged on an identical board perpendicular to a horizontal direction has been discussed (see, for example, Patent Literature 1).

CITATION LIST

Patent Literature

Patent Literature 1: European Patent Application Publication No. 3232118

SUMMARY OF THE INVENTION

Problems to be Solved by the Invention

Here, in the vehicle lighting device described in Patent Literature 1, the high-beam light source and the low-beam light source are arranged on the identical board, and the lights from both the high-beam light source and the low-beam light source are emitted through the identical lens after passing through the single focal point, and therefore the presence of a low-beam shade provided near the single focal point easily forms a dark area at the boundary between the high-beam distribution light and the low-beam distribution light. Furthermore, as the identical lens is used, the high-beam light source and the low-beam light source need to be arranged for the single focal point, which makes it difficult to properly form the configuration for high beams due to the issue of installation space and makes it difficult to increase the luminous intensity of high beams.

In addition, recent vehicle lighting devices have adopted a system that blocks some regions of high beams to avoid irradiation to a vehicle coming in the opposite direction and a vehicle in front. In this system, for example, some of a plurality of high-beam light sources are turned off to avoid irradiation to a vehicle coming in the opposite direction and a vehicle in front and, for this control, direct-emission type high-beam light sources, which directly emit light to a high-beam lens, are preferable in terms of easy control. Conversely, for low beams, it is preferable to include a reflector that forms a concave reflective surface based on a spheroid for the purpose of diffusing light, and the like. Thus, it is preferable to have the high-beam light source facing the lens so as to directly emit light and have the low-beam light source via the reflector and, for this reason, it is not easy to mount the high-beam light source and the low-beam light source on the identical board in the first place as in the vehicle lighting device described in Patent Literature 1.

As described above, it is not easy to mount the high-beam light source and the low-beam light source on the identical board, and even if they are mounted on the identical board, there are issues regarding dark areas and the luminous intensity of high beams. As a result, it is difficult to achieve a reduction in the number of parts and a reduction in the number of assembly manhours by mounting the high-beam light source and the low-beam light source on the identical board.

The present invention has been made to solve the above conventional issues and has an object to provide a vehicle lighting device that may achieve a reduction in the number of parts and a reduction in the number of assembly man-hours.

Means for Solving the Problems

A vehicle lighting device according to the present invention includes a high-beam light source to form a high beam light distribution pattern, a low-beam light source to form a low beam light distribution pattern, a high-beam lens to transmit light from the high-beam light source and emit the light to outside, a low-beam lens to transmit light from the low-beam light source and emit the light to outside, a circuit board having the high-beam light source and the low-beam light source mounted thereon together, and a reflector that guides light emitted from the low-beam light source to the low-beam lens, wherein when lens optical axis directions of the high-beam lens and the low-beam lens are in a front-rear direction, the circuit board is inclined in the front-rear direction and an up-down direction perpendicular to the front-rear direction.

Effect of the Invention

According to the present invention, it is possible to provide a vehicle lighting device in which a high-beam light source and a low-beam light source are mounted on an identical circuit board to achieve a reduction in the number of parts and a reduction in the number of assembly man-hours.

MODE FOR CARRYING OUT THE INVENTION

The present invention will be described below according to a preferred embodiment. Further, the present invention is not limited to the embodiment described below and may be modified as appropriate without departing from the scope of the present invention. Moreover, according to the embodiment described below, the illustration and description of some parts of configurations are omitted, but it is obvious that publicly-known or well-known techniques are applied to the details of the omitted techniques as appropriate to the extent that there are no contradictions with the contents described below.

Figure 1:
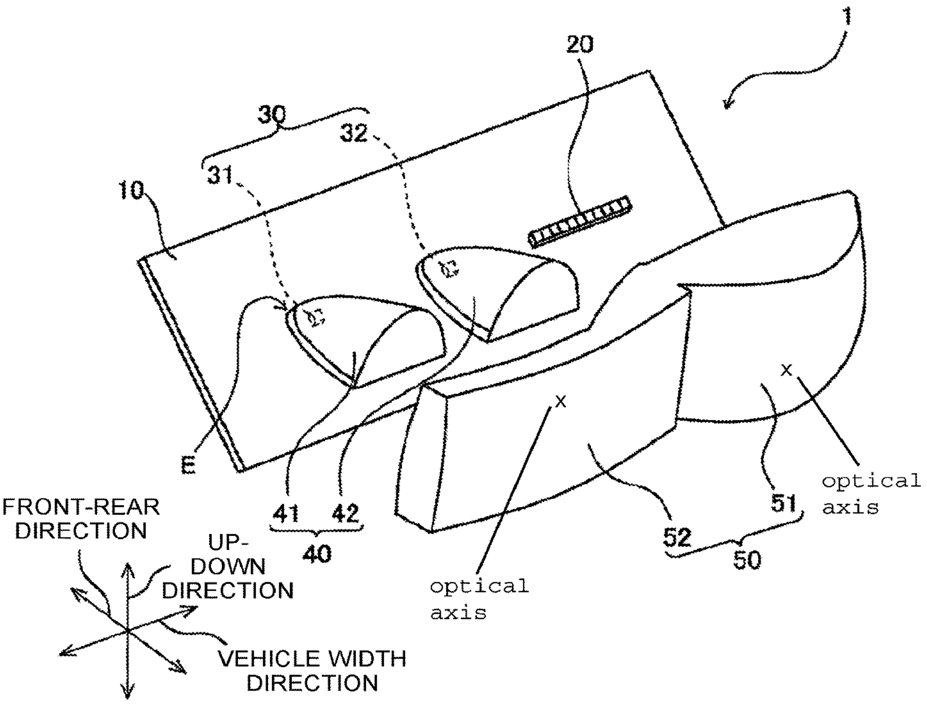
FIG. 1 is a relevant part perspective view illustrating a vehicle lighting device according to the present embodiment.

FIG. 1 is a relevant part perspective view illustrating a vehicle lighting device according to the present embodiment. A vehicle lighting device 1 illustrated in FIG. 1 is configured as, for example, a front light provided in a vehicle front portion and includes a circuit board 10, a high-light source group (high-beam light source) 20, a low-light source group (low-beam light source) 30, a reflector 40, and a lens 50. The elements including the circuit board 10, the high-light source group 20, the low-light source group 30, and the reflector 40 are accommodated in a light chamber formed by, for example, the lens 50 and a housing that is not illustrated.

The circuit board 10 is a board member on which a drive circuit for lighting control and a circuit for power supply are mounted. On the circuit board 10, the high-light source group 20, the low-light source group 30, and the plurality of reflectors 40 are mounted.

The high-light source group 20 is a light source to form a high beam light distribution pattern and includes a light source array in which a plurality of semiconductor-type light sources is arranged in a horizontal direction. The high-light source group 20 is configured as a direct-emission type that emits light toward the lens 50 without passing through a reflector, for example.

The low-light source group 30 includes, for example, a plurality of (two) semiconductor-type first and second light sources 31, 32, which are arranged side by side on the side of the high-light source group 20 on the identical circuit board 10. Specifically, the low-light source group 30 and the high-light source group 20 are arranged at the identical height in a vertical direction (an up-down direction in FIG. 1) while installed on the circuit board 10.

A first reflector 41 is provided above the first light source 31 of the low-light source group 30, and a second reflector 42 is provided above the second light source 32. The first and second reflectors 41, 42 guide the lights from the first and second light sources 31, 32 to a low-beam lens 52 described below, and the light from the first light source 31 is reflected by the first reflector 41 to form a concentrated light distribution pattern (one of the low beam light distribution patterns) that is multiplexed with a diffuse light distribution pattern described below. Further, the light from the second light source 32 is reflected by the second reflector 42 to form, for example, the diffuse light distribution pattern (one of the low beam light distribution patterns) having a wide irradiation area.

The plurality of reflectors 40 includes the first reflector 41 and the second reflector 42. The first and second reflectors 41, 42 each have a concave reflective surface on their inner surfaces based on a spheroid and are arranged with the open side of the spheroid facing the side of the lens 50.

The lens 50 is a light-transmitting optical component to cause the lights to be incident from the high-light source group 20 and the low-light source group 30 and emit them to the outside. The lens 50 includes a high-beam lens 51 to transmit the light from the high-light source group 20 and emit it to the outside and the low-beam lens 52 to transmit the light from the low-light source group 30 and emit it to the outside, and the high-beam and low-beam lenses 51, 52 are integrated as a single component.

Furthermore, in the lens 50, the low-beam lens 52 is formed to be thinner-walled than the high-beam lens 51. Here, according to the present embodiment, the light from the high-light source group 20 directly enters the high-beam lens 51, while the light from the low-light source group 30 enters the low-beam lens 52 via the plurality of reflectors 40. Therefore, the lens 50 is made thinner on the low-beam side, on which the distance to the focal point tends to be longer due to the reflector 40, so as to obtain an appropriate shape.

Furthermore, due to the fact that the two first and second reflectors 41, 42 are provided for the low-light source group 30, the low-beam lens 52 is configured to be wider than the high-beam lens 51.

Furthermore, in the vehicle lighting device 1 according to the present embodiment, when the lens optical axis directions of the high-beam lens 51 and the low-beam lens 52 are in a front-rear direction, the circuit board 10 is fixedly arranged in the lighting chamber while inclined in both the front-rear direction and the up-down direction perpendicular to the front-rear direction. Specifically, the circuit board 10 is inclined at 30° or more and 60° or less with respect to the front-rear direction. Furthermore, the circuit board 10 is arranged along a vehicle width direction (or the direction in which the high-beam lens 51 and the low-beam lens 52 are arranged), but not limited thereto, and may be inclined with respect to the vehicle width direction (or the above-described arrangement direction).

As described above, the circuit board 10 is inclined in both the front-rear direction and the up-down direction, and therefore the plane direction is in an intermediate direction with respect to both the front-rear direction and the up-down direction. Accordingly, the high-light source group 20 may be in a form similar to a direct-emission type, and the low-light source group 30 may also emit the light through the reflector 40.

Figure 2:
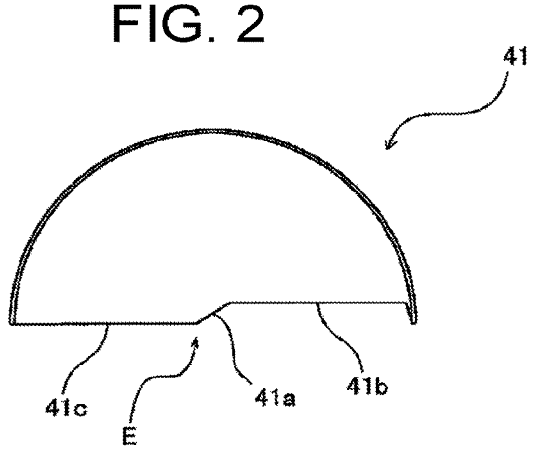
FIG. 2 is a front view of a first reflector illustrated in FIG. 1.

FIG. 2 is a front view of the first reflector 41 illustrated in FIG. 1. As illustrated in FIG. 2, the first reflector 41 is arranged such that its rear end E is located at the focal point of the low-beam lens 52 or at a nearby position thereof. In addition, in the first reflector 41, the shape of the rear end E is different from that of the second reflector 42 and is a stepped shape to form a cutoff line in the light distribution pattern. That is, in the first reflector 41, the shape of the rear end E includes an inclined portion 41*a*, which corresponds to a cutoff line, and a first horizontal portion 41*b* and a second horizontal portion 41*c* that are continuous with the inclined portion 41*a* and extend in a horizontal direction.

With such a rear end shape, the light from the first light source 31 forms a cutoff line when reflected by the first reflector 41 and, without using a shade to form a cutoff line, an appropriate light distribution pattern may be formed.

Furthermore, as it is clear from the fact that the focal point of the low-beam lens 52 is located at the rear end E of the first reflector 41 according to the present embodiment, the optical axis of the high-beam lens 51 is located lower than the optical axis of the low-beam lens 52 (both the optical axes are parallel). Accordingly, for example, high beams may be properly emitted from the high-beam lens 51, and low beams may also be properly emitted from the low-beam lens 52. That is, when both the optical axes are at the identical height, the position of the optical axis may be inappropriate for at least one of the beams, but in the configuration according to the present embodiment, the optical axis of the high-beam lens 51 is lower, and an appropriate light distribution pattern may be formed.

Figure 3:
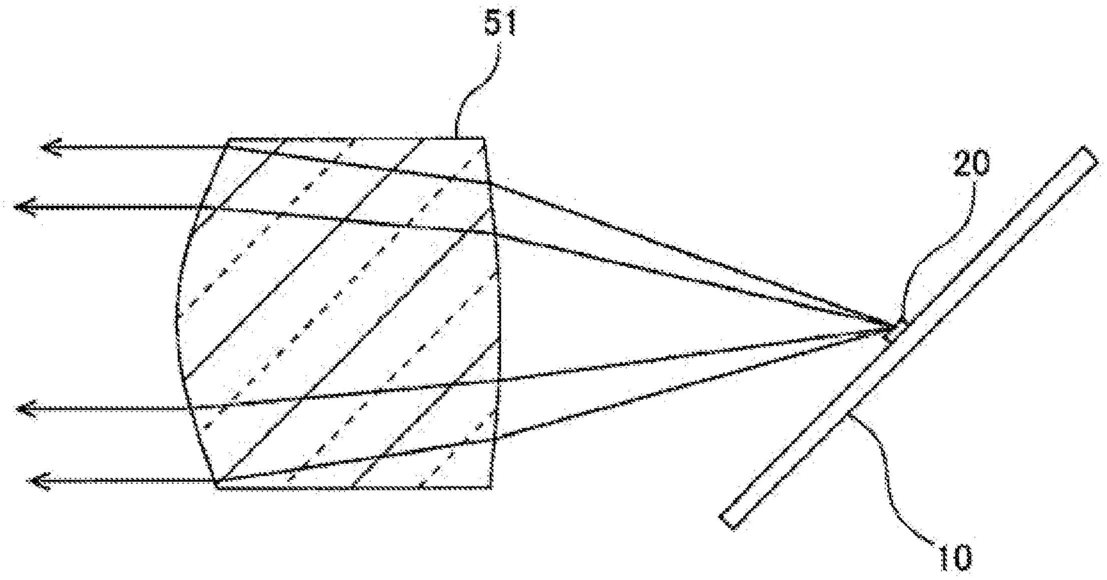
FIG. 3 is a concept illustrating a state of light emitted from a high-light source group illustrated in FIG. 1.

Next, the effect of the vehicle lighting device 1 according to the present embodiment will be described. FIG. 3 is a concept illustrating the state of the light emitted from the high-light source group 20 illustrated in FIG. 1, and FIG. 4 is a concept illustrating the state of the light emitted from the low-light source group 30 illustrated in FIG. 1.

First, as illustrated in FIG. 3, when each of the light sources included in the high-light source group 20 is turned on, the light from each light source directly reaches the high-beam lens 51, is refracted by the high-beam lens 51, and is then emitted to the outside. When there is an area that needs to be partially shaded, such as a vehicle coming in the opposite direction or a vehicle in front, for example, some of the light sources in the high-light source group 20 are turned off.

Figure 4:
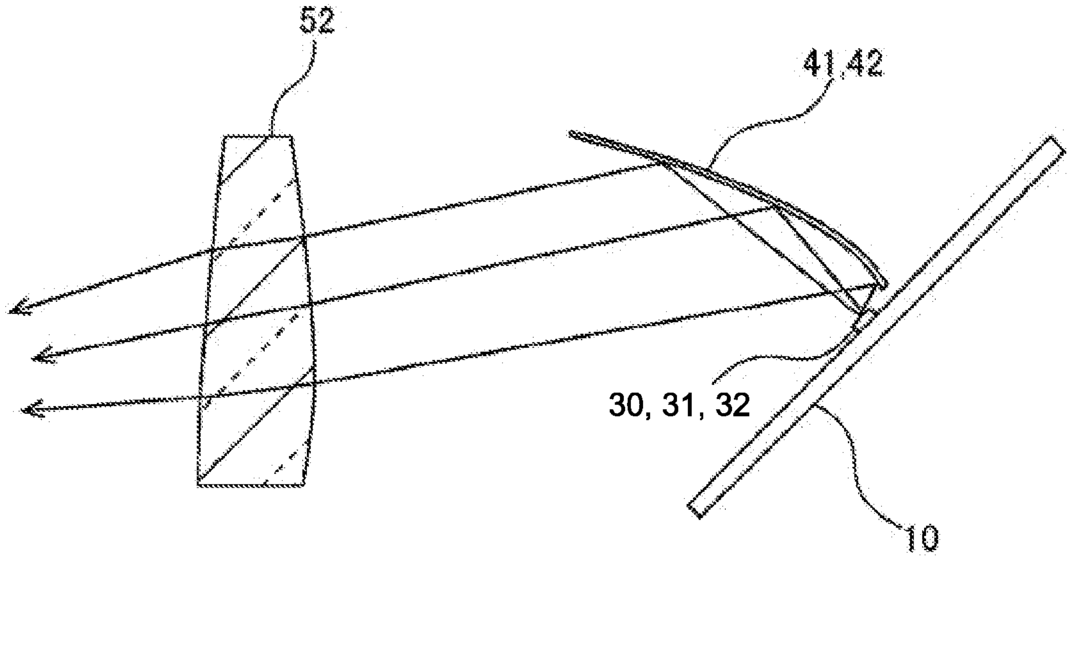
FIG. 4 is a concept illustrating a state of light emitted from a low-light source group illustrated in FIG. 1.

Furthermore, as illustrated in FIG. 4, when each of the first and second light sources 31, 32 included in the low-light source group 30 is turned on, the lights from the first and second light sources 31, 32 are reflected by the first and second reflectors 41, 42, then reach the low-beam lens 52, refracted by the low-beam lens 52, and are then emitted to the outside. In particular, the light from the first light source 31 is reflected by the first reflector 41 to form a cutoff line and is emitted to the outside without passing through a shade.

As described above, in the vehicle lighting device 1 according to the present embodiment, even though the high-light source group 20 and the low-light source group 30 are mounted on the identical circuit board 10, the lights are emitted through the different high-beam and low-beam lenses 51, 52. In other words, with the different high-beam and low-beam lenses 51, 52, an appropriate light distribution pattern is easily formed. Furthermore, there is no need to install the high-light source group 20 and the low-light source group 30 for the single focal point, as is the case where a common lens is used, and therefore there is no issue of installation space or no difficulty in increasing the luminous intensity of high beams.

Furthermore, as the vehicle lighting device 1 according to the present embodiment does not include a shade, no beams are blocked by a shade, and the light flux use efficiency of the high-light source group 20 and the low-light source group 30 may be improved.

Furthermore, as the circuit board 10 is inclined in the front-rear direction and the up-down direction, the high-light source group 20 emits the light to the high-beam lens 51 like a direct-emission type, while the low-light source group 30 emits the light after being reflected by the reflector 40.

As described above, the vehicle lighting device 1 according to the present embodiment includes the circuit board 10 having the high-light source group 20 and the low-light source group 30 mounted thereon, the high-beam lens 51, and the low-beam lens 52. Therefore, even though the high-light source group 20 and the low-light source group 30 are mounted on the identical circuit board 10, the different high-beam and low-beam lenses 51, 52 may easily form an appropriate light distribution pattern. Furthermore, as the different high-beam and low-beam lenses 51, 52 are provided, there is no need to install the high-light source group 20 and the low-light source group 30 for the single focal point as in the case of using a common lens and, even if a shade is provided, the shade would not block high beams, and dark areas are unlikely to be formed. In addition, the configuration for high beams and the configuration for low beams are not closely spaced for the single focal point, and the luminous intensity of high beams may be increased in a relatively easy way.

Furthermore, as the circuit board 10 is inclined in both the front-rear direction and the up-down direction, the plane direction is in an intermediate direction with respect to both the front-rear direction and the up-down direction. Accordingly, the high-light source group 20 may be in a form similar to a direct-emission type, and the low-light source group 30 may also emit the light through the reflector 40.

As described above, various issues have been resolved regarding mounting the high-light source group 20 and the low-light source group 30 on the identical circuit board 10, and it is possible to provide the vehicle lighting device 1 having the high-light source group 20 and the low-light source group 30 mounted on the identical circuit board 10 to achieve a reduction in the number of parts and a reduction in the number of assembly manhours.

Furthermore, in the first reflector 41, the rear end located at the focal point or near the focal point has a shape corresponding to a cutoff line, and therefore the low beam light distribution pattern having a cutoff line may be formed without a shade.

Furthermore, the low-beam lens 52 is formed to be thinner-walled than the high-beam lens 51 so as to obtain the thin lens on the low-beam side where the distance to the focal point tends to be longer due to the reflector 40 so that the low-beam lens 52 having an appropriate wall thickness may be formed.

Furthermore, as the circuit board 10 is inclined at 30° or more and 60° or less with respect to the front-rear direction, it is possible to prevent a situation where the emission of the light from either one of the high-light and low-light source groups 20, 30 is significantly difficult, as in the case of inclination at 30° or less and 60° or more in the up-down direction.

Further, as the high-beam lens 51 and the low-beam lens 52 are integrated as a single component, the use of the common part may further achieve a reduction in the number of parts and a reduction in the number of assembly manhours.

Furthermore, the high-light source group 20 and the low-light source group 30 are arranged at the identical height in the vertical direction while installed on the circuit board 10, and the optical axis of the high-beam lens 51 is located lower than the optical axis of the low-beam lens 52, and thus an appropriate light distribution pattern may be formed.

The present invention has been described above based on the embodiment, but the present invention is not limited to the above embodiment, and modifications may be made without departing from the scope of the present invention, and publicly-known and well-known techniques may be combined.

For example, according to the present embodiment, the lens 50 is a single integrated component of the high-beam lens 51 and the low-beam lens 52, but is not limited thereto, and may be configured with different components.

Furthermore, according to the above embodiment, the first reflector 41 is configured without a shade as the rear end E has a shape corresponding to a cutoff line, but is not limited thereto, and may include a shade.

Further, the present embodiment is applied to the front light on the premise in the description, but is not limited thereto and, if it is applicable, may be applied to vehicle lighting devices that emit light in other directions.

In addition, according to the present embodiment, the low-light source group 30 and the high-light source group 20 are arranged at the identical height, but not particularly limited thereto, and the height positions may be different. In this case, it is obvious that a configuration may be such that the optical axis of the high-beam lens 51 is not located lower than the optical axis of the low-beam lens 52, for example, located higher or at the identical height.

DESCRIPTION OF REFERENCE NUMERALS

- 1 Vehicle lighting device
- 10 Circuit board
- 20 High-light source group (high-beam light source)
- 30 Low-light source group (low-beam light source)
- 40 Reflector
- 51 High-beam lens
- 52 Low-beam lens
- E Rear end

The invention claimed is:

1. A vehicle lighting device comprising:

a high-beam light source to form a high beam light distribution pattern;

a low-beam light source to form a low beam light distribution pattern;

a high-beam lens to transmit light from the high-beam light source and emit the light;

a low-beam lens to transmit light from the low-beam light source and emit the light;

a circuit board having the high-beam light source and the low-beam light source mounted thereon together; and a reflector that guides light emitted from the low-beam light source to the low-beam lens, wherein when lens optical axis directions of the high-beam lens and the low-beam lens are in a front-rear direction, the circuit board is inclined in the front-rear direction and an up-down direction perpendicular to the front-rear direction.

2. The vehicle lighting device according to claim 1, wherein the reflector has a rear end located at a focal point of the low-beam lens or near the focal point, and the rear end has a shape corresponding to a cutoff line to form a low beam light distribution pattern having the cutoff line formed therein.

3. The vehicle lighting device according to claim 1, wherein the low-beam lens has a smaller dimension in the front-rear direction than a dimension of the high-beam lens in the front-rear direction.

4. The vehicle lighting device according to claim 1, wherein the circuit board is inclined at 30° or more and 60° or less with respect to the front-rear direction.

5. The vehicle lighting device according to claim 1, wherein the high-beam lens and the low-beam lens are integrated as a single component.

6. The vehicle lighting device according to claim 1, wherein the high-beam light source and the low-beam light source are arranged at an identical height in a vertical direction while installed on the circuit board, and an optical axis of the high-beam lens is located lower than an optical axis of the low-beam lens.

* * * * *